United States Patent
Zhang et al.

(10) Patent No.: US 11,689,273 B2
(45) Date of Patent: Jun. 27, 2023

(54) DOWNLINK SIGNAL RECEPTION WITH ANTENNA PANEL SWITCHING

(71) Applicant: Apple Inc., Cupertino, CA (US)

(72) Inventors: Yushu Zhang, Beijing (CN); Dawei Zhang, Saratoga, CA (US); Haitong Sun, Irvine, CA (US); Wei Zeng, San Diego, CA (US); Hong He, Cupertino, CA (US); Yuchul Kim, Santa Clara, CA (US); Chunhai Yao, Beijing (CN); Haijing Hu, Beijing (CN)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 17/002,734

(22) Filed: Aug. 25, 2020

(65) Prior Publication Data

US 2021/0099223 A1  Apr. 1, 2021

(30) Foreign Application Priority Data

Sep. 27, 2019  (CN) .......................... 201910920469.X

(51) Int. Cl.
*H04B 7/08* (2006.01)
*H04L 5/00* (2006.01)
*H04W 72/23* (2023.01)

(52) U.S. Cl.
CPC ......... *H04B 7/0828* (2013.01); *H04L 5/0048* (2013.01); *H04W 72/23* (2023.01)

(58) Field of Classification Search
USPC ....................................................... 370/329
See application file for complete search history.

(56) References Cited

U.S. PATENT DOCUMENTS

| 8,134,938 | B2 | 3/2012 | Yi et al. |
| 9,148,825 | B2 | 9/2015 | Choi et al. |
| 10,873,386 | B2 * | 12/2020 | Zhou .................. H04W 52/028 |
| 2019/0260456 | A1 | 8/2019 | Zhou et al. |

(Continued)

FOREIGN PATENT DOCUMENTS

WO   WO-2018232090 A1 * 12/2018   .......... H04B 7/0641

OTHER PUBLICATIONS

Vivo, Jan. 2017, 3GPP TSG RAN WG1 AH_NR Meeting (Year: 2017).*

(Continued)

*Primary Examiner* — Jeffrey M Rutkowski
*Assistant Examiner* — Luna Weissberger
(74) *Attorney, Agent, or Firm* — Kowert, Hood, Munyon, Rankin & Goetzel, P.C.

(57) ABSTRACT

Apparatuses, systems, and methods for performing downlink signal reception with antenna panel switching in a wireless communication system. A cellular base station may receive an indication of an antenna panel activation delay from a wireless device. The cellular base station may select a scheduling offset for a transmission to the wireless device based at least in part on the antenna panel activation delay. The scheduling offset may be selected to be at least the length of the antenna panel activation delay if it is expected that the wireless device may perform antenna panel activation to receive the transmission. The cellular base station may schedule the transmission to the wireless device using the selected scheduling offset, and may perform the transmission to the wireless device at the selected scheduling offset after scheduling the transmission to the wireless device.

20 Claims, 9 Drawing Sheets

(56) References Cited

U.S. PATENT DOCUMENTS

| | | | | |
|---|---|---|---|---|
| 2019/0260458 A1* | 8/2019 | Zhou | ................... | H04W 72/542 |
| 2020/0119875 A1* | 4/2020 | John Wilson | ......... | H04W 72/23 |
| 2020/0169995 A1 | 5/2020 | Nam et al. | | |
| 2021/0068123 A1* | 3/2021 | Zhu | ..................... | H04B 7/0814 |
| 2022/0022207 A1* | 1/2022 | Matsumura | ........... | H04W 72/23 |

OTHER PUBLICATIONS

ZTE, Draft CR on AP-CSI-RS with a large latency of beam switching, 2019, R1-1905616 (Year: 2019).*
3GPP, TS 38.214 V15.6.0, 2019 (Year: 2019).*
Extended European Search Report for EP Application No. 20195019. 3-1220 dated Dec. 17, 2020, 12 pages.

* cited by examiner

DOWNLINK SIGNAL RECEPTION WITH ANTENNA PANEL SWITCHING

PRIORITY DATA

This application claims benefit of priority to Chinese Application No. 201910920469.X, titled "Downlink Signal Reception with Antenna Panel Switching", filed Sep. 27, 2019, which is hereby incorporated by reference in its entirety as though fully and completely set forth herein.

FIELD

The present application relates to wireless devices, and more particularly to apparatus, systems, and methods for performing downlink signal reception with antenna panel switching in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for performing downlink signal reception with antenna panel switching in a wireless communication system.

According to the techniques described herein, a cellular base station and a wireless device may utilize a framework to determine how long the wireless device needs to activate an inactive antenna panel, and to determine under which circumstances to provide the wireless device with additional time between scheduling a transmission and performing the transmission to perform such antenna panel activation.

Using the techniques described herein may improve the ability of wireless devices to efficiently utilize multiple antenna panels to improve cellular communication performance, with a potentially reduced power consumption cost relative to always maintaining those multiple antenna panels in an activated state, at least according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
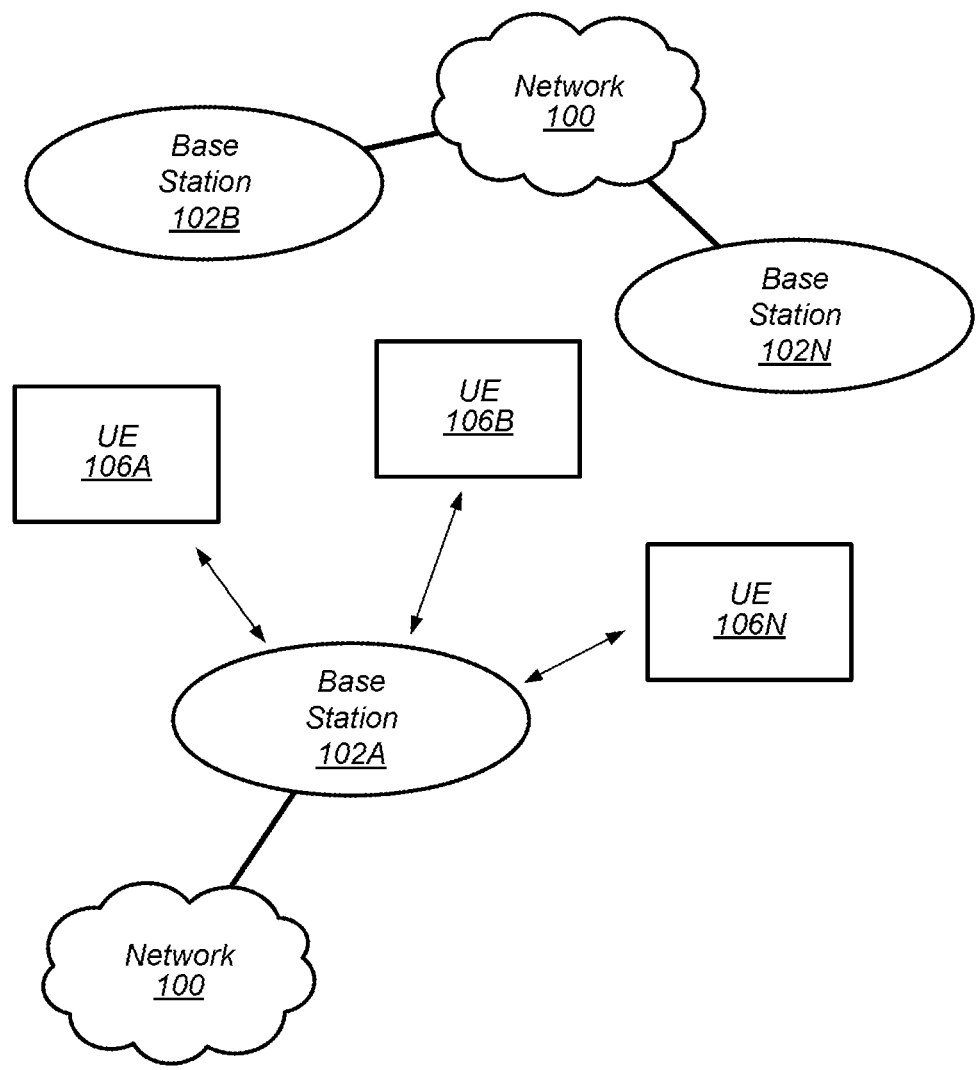
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system)

analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
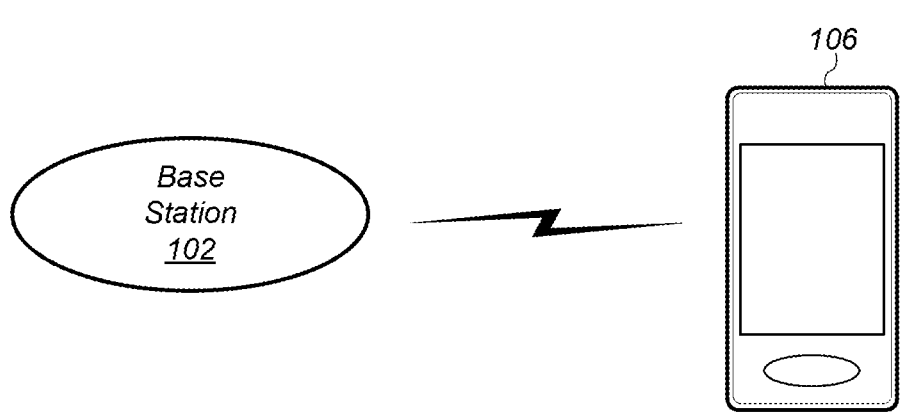
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
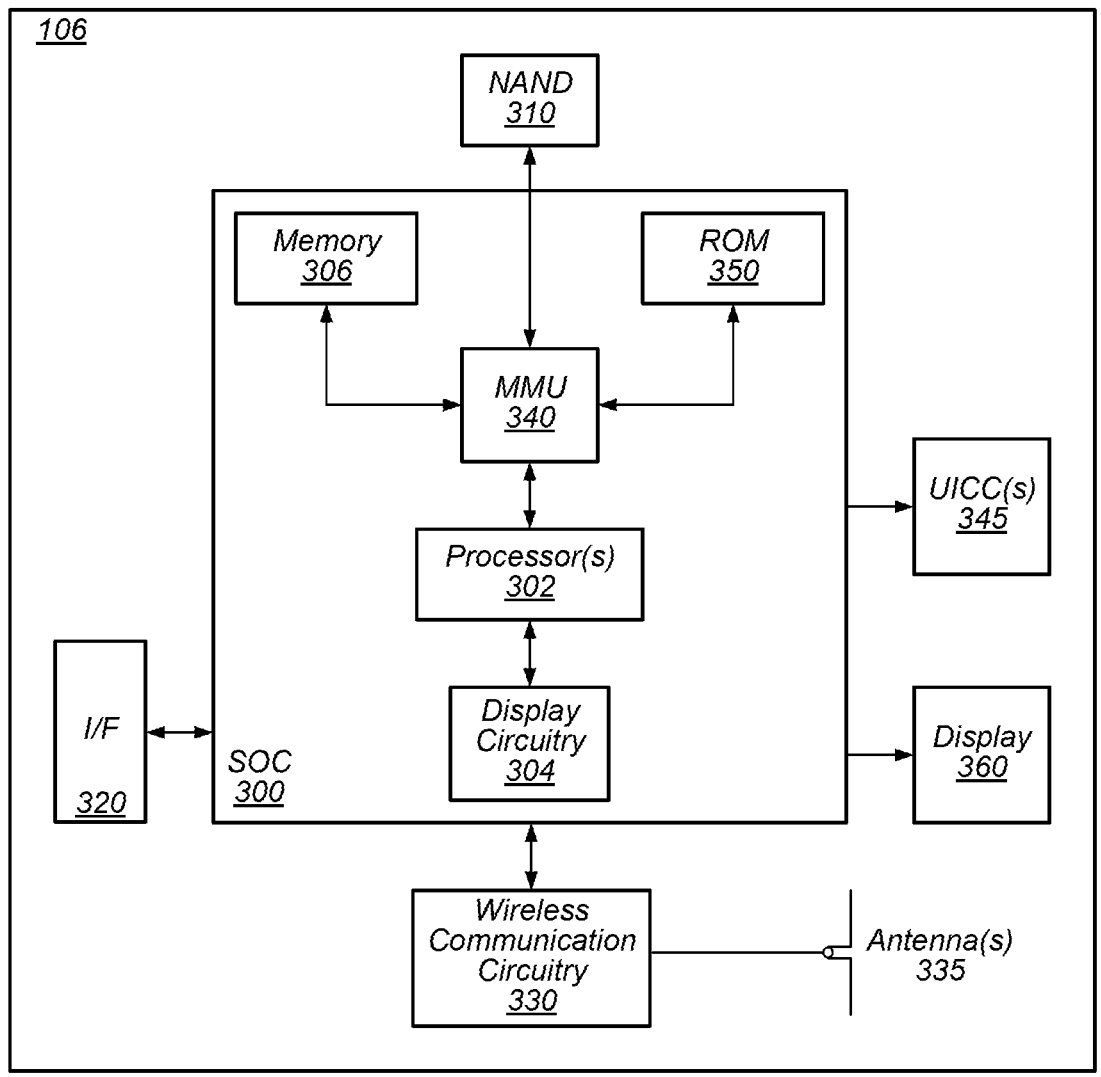
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
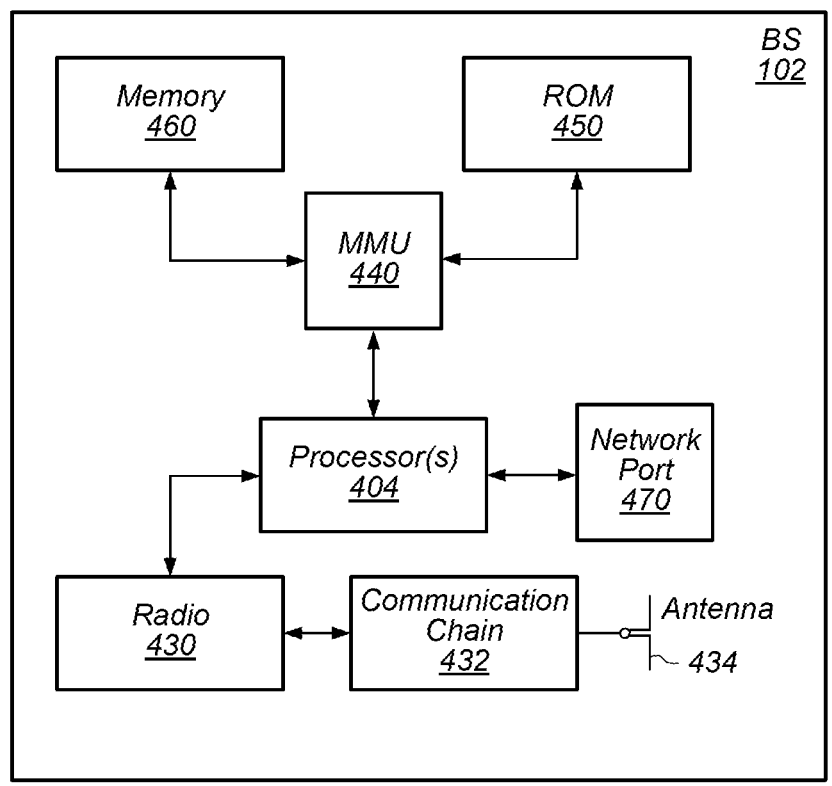
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
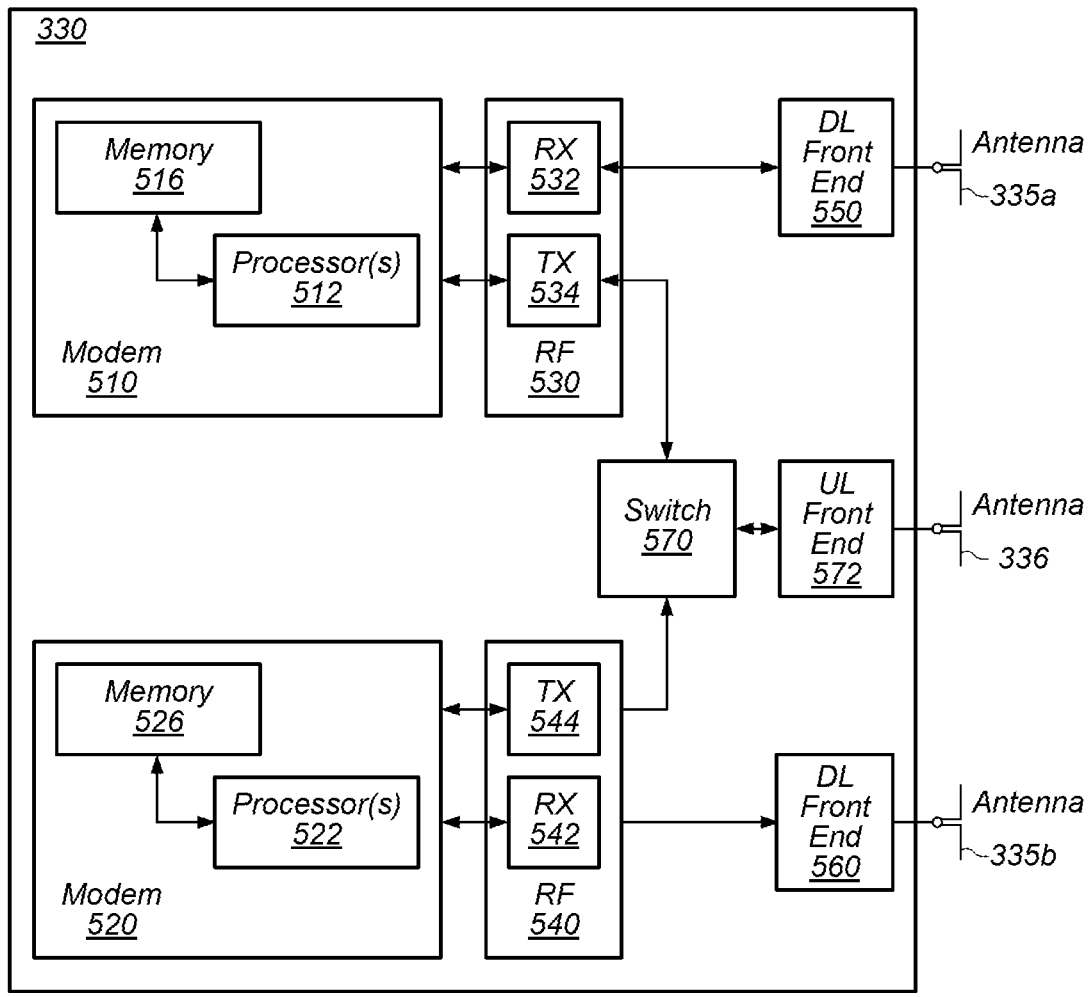
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
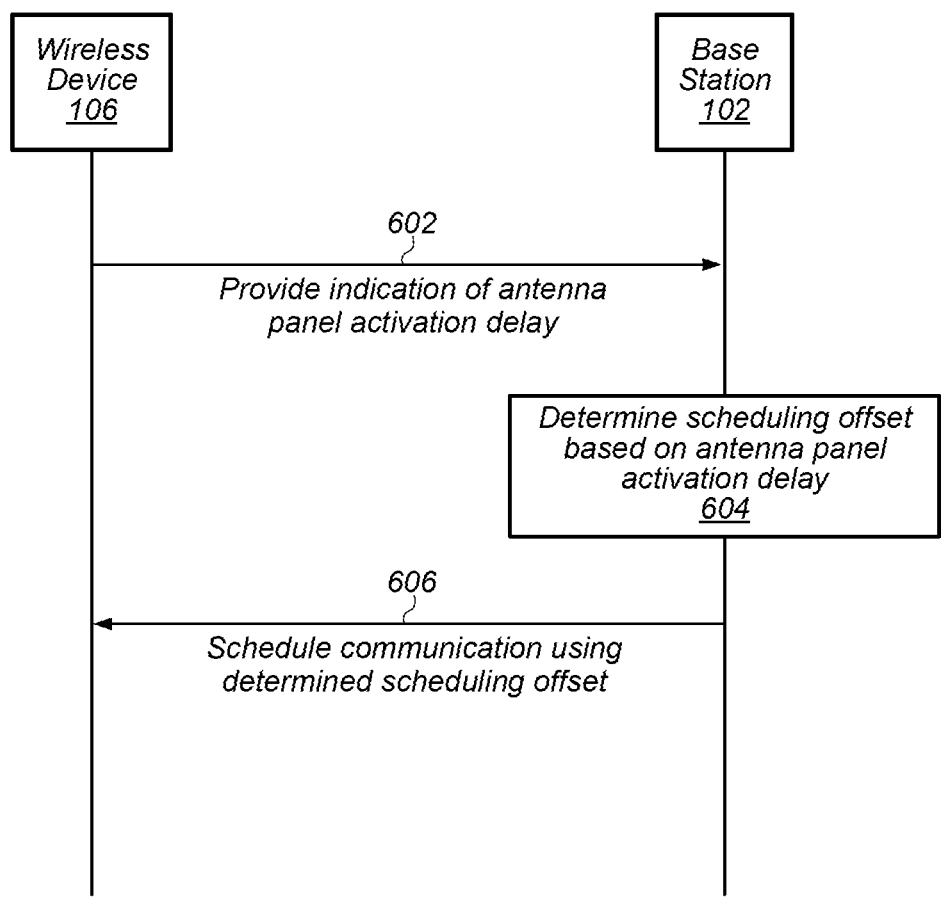
FIG. 6 is a flowchart diagram illustrating an example method for performing downlink signal reception with support for antenna panel switching, according to some embodiments.

FIG. 6—Downlink Signal Reception with Antenna Panel Switching

New cellular communication techniques are continually under development, to increase coverage, to better serve the range of demands and use cases, and for a variety of other reasons.

One development that is increasingly common includes the use of multiple antenna panels by a wireless device. The panels can be located in an arrangement such that different panels can provide beam targeting in different directions, potentially increasing the effective coverage of the wireless device. However, it may not be practical for a wireless device to always maintain all of its antenna panels in an activated state, for example due to the power consumption cost to do so in view of battery constraints, at least for some wireless devices. Accordingly, since different antenna panels may provide better performance at different times (e.g., due to wireless device movement/rotation), it may be useful to provide techniques for a cellular base station to support antenna panel switching by wireless devices performing downlink signal reception in a wireless communication system.

FIG. 6 is a signal flow diagram illustrating an example of such a method, at least according to some embodiments. Aspects of the method of FIG. 6 may be implemented by a wireless device such as a UE 106 illustrated in various of the Figures herein, a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, the wireless device may provide an indication to the cellular base station of an antenna panel activation delay applicable to the wireless device. The antenna panel activation delay indication may include a value indicative of a minimal length of time (e.g., in symbols, slots, milliseconds, or any other unit of time defined in accordance with the cellular communication system) that the wireless device needs to activate an antenna panel of the wireless device that is not already active, according to some embodiments. The indication may also implicitly indicate a minimal length of time that the wireless device requests between scheduling a communication and performing a communication when the wireless device does not need to activate an antenna panel of the wireless device. For example, certain values (e.g., those above a certain threshold) that can be indicated in the antenna panel activation delay may implicitly be associated with certain (e.g., smaller) values that may be considered as the minimal length of time that the wireless device requests between scheduling a communication and performing a communication (a "scheduling offset") when the wireless device does not need to activate an antenna panel of the wireless device. Alternatively, the wireless device may provide an additional indication explicitly indicating a minimal length of time that the wireless device requests between scheduling a communication and performing a communication when the wireless device does not need to activate an antenna panel of the wireless device.

According to some embodiments, the wireless device may additionally provide any of various other types of information to the cellular base station to help support the cellular base station's ability to determine when to use a scheduling offset having a length of at least the antenna panel activation delay indicated by the wireless device. For example, in some embodiments, the wireless device may provide an indication of a number of beam groups and a number of beams per beam group of the wireless device to the cellular base station. In some instances, it may also be possible for the wireless device to provide an indication of an updated antenna panel activation delay of the wireless device; for example, the wireless device could update its antenna panel activation delay to a lower value if all of its antenna panels are already active, e.g., to indicate that additional delay for antenna panel activation is not needed by the wireless device.

In 604, the cellular base station may determine a scheduling offset for a downlink communication to the wireless device based at least in part on the indicated antenna panel activation delay. For example, the cellular base station may determine whether the wireless device is likely to need additional time to perform antenna panel activation for the downlink communication, and if so, to select a scheduling offset that is at least the length of the indicated antenna panel activation delay.

The manner in which the cellular base station determines whether the wireless device is likely to need additional time to perform antenna panel activation may depend at least in part on a type of downlink communication being scheduled, in some embodiments. For example, for an aperiodic channel state information reference signal (CSI-RS) transmission for beam management (e.g., for which repetition is configured to be "on" to facilitate wireless device receive beam sweeping to receive the CSI-RS resources), the cellular base station may consider whether the wireless device has multiple beam groups, and how many beams per beam group are supported by the wireless device. If the wireless device does have multiple beam groups, and if the number of CSI-RS resources being scheduled for the aperiodic CSI-RS transmission is above the number of beams per beam group supported by the wireless device, the cellular base station may determine that the wireless device is likely to need additional time to perform antenna panel activation for the downlink communication. In such a scenario, the cellular base station may select a value of at least the antenna panel activation delay as the scheduling offset. In contrast, if the wireless device does not have multiple beam groups, or if the number of CSI-RS resources being scheduled for the aperiodic CSI-RS transmission is not greater than the number of beams per beam group supported by the wireless device, the cellular base station may determine that the wireless device is unlikely to need additional time to perform antenna panel activation for the downlink communication. In such a scenario, the cellular base station may select a value of less than the antenna panel activation delay as the scheduling offset.

Note that according to some embodiments, in the case of an aperiodic CSI-RS transmission for beam management, the wireless device may be able to use its currently active antenna panel for at least part of the transmission, and so the cellular base station may select a value of less than the antenna panel activation delay as the scheduling offset even if the cellular base station determines that the wireless device is likely to need additional time to perform antenna panel activation for the downlink communication. As one possibility, in such a scenario, the cellular base station may select a scheduling offset such that at least the antenna panel activation delay passes before the end of the transmission to the wireless device, and more particularly such that at least the antenna panel activation delay passes by the portion of the downlink transmission for which antenna panel activation by the wireless device may be required. For example, the cellular base station could select a scheduling offset for such a downlink communication such that the minimal delay between scheduling the downlink communication and the (K+1)th resource of the downlink communication is at least the antenna panel activation delay, where K is equal to the number of beams per beam group supported by the wireless device.

As further possibility, for an aperiodic channel state information reference signal (CSI-RS) transmission for tracking, an aperiodic CSI-RS transmission for channel state information acquisition, or a physical downlink shared channel (PDSCH) transmission, the cellular base station may consider whether a transmission configuration indicator (TCI) state for the transmission is stale or out-of-date. In such a scenario, the cellular base station may determine that the wireless device is likely to need additional time to perform antenna panel activation for the downlink communication if the TCI state for the transmission is stale or out-of-date, and to determine that the wireless device is unlikely to need additional time to perform antenna panel activation for the downlink communication if the TCI state for the transmission is fresh or in-date. Accordingly, the cellular base station may select a value of at least the antenna panel activation delay as the scheduling offset when the TCI state is determined to be stale or out-of-date, and the cellular base station may select a value of less than the antenna panel activation delay as the scheduling offset when the TCI state is determined to be fresh or in-date.

Determining whether the TCI state is fresh/in-date or stale/out-of-date may be performed in any of various ways. As one possibility, if one (or multiple, or all, according to various embodiments) of a certain set of configured conditions are met, the cellular base station may determine that the TCI state is stale/out-of-date. One such possible condition may include if a downlink reference signal in the TCI state or quasi-co-located with a reference signal in the TCI state has not been reported by the wireless device within a threshold amount of time. Another such possible condition may include if a downlink reference signal in the TCI state is not configured in a TCI state for a control resource set or quasi-co-located with a downlink reference signal that is configured in a TCI state for a control resource set for the wireless device. A further such possible condition may include if a PDSCH transmission with the TCI state has not been transmitted to the wireless device within a threshold amount of time. A still further possible condition could include if a periodic CSI-RS or semi-persistent CSI-RS with the TCI state has not been transmitted to the wireless device within a threshold amount of time. Note that the threshold(s) for the various possible conditions may be the same or different, as desired. In some instances, one or more thresholds may be predefined (e.g., specified by cellular communication standard specification documents). Alternatively, one or more thresholds may be semi-statically or dynamically configured, e.g., based on UE capability reporting, RRC signaling, broadcast system information, or in any of various other ways. Note also that any or all of various other conditions for determining whether a TCI state is considered stale or fresh may additionally or alternatively be configured, as desired.

Note that while in some instances, the cellular base station may always select a scheduling offset that is at least equal to the indicated antenna panel activation delay when it is determined that the wireless device is likely to need additional time to perform antenna panel activation for a downlink communication, it is also possible that the cellular base station could be permitted to select a scheduling offset that is less than the indicated antenna panel activation delay, and may do so at its discretion or in certain specified circumstances.

In 606, the cellular base station may schedule the downlink communication using the selected scheduling offset. This may include providing a physical downlink control channel (PDCCH) communication indicating that the downlink communication is scheduled to be performed at the scheduling offset after the PDCCH communication, at least according to some embodiments. The cellular base station may further perform the scheduled transmission to the wireless device at the scheduling offset after scheduling the transmission to the wireless device.

The wireless device may perform antenna panel activation to receive the communication if needed and if sufficient time is provided by the scheduling offset to do so. If the scheduling offset is not sufficient to perform antenna panel activation (e.g., and the wireless device would otherwise activate at least one antenna panel to receive the transmission), the wireless device may apply a default TCI state to receive the transmission. The default TCI state may be determined in any of various ways that can be independently determined by both the wireless device and the cellular base station. For example, as one possibility, the default TCI state may be considered the TCI state for a control resource set with a lowest control resource set ID in the latest slots, when multiple control resource sets are configured.

Thus, using the method of FIG. 6, it may be possible to effectively support antenna panel switching by a wireless device in a wireless communication system. This may allow for wireless devices to efficiently utilize multiple antenna panels to improve cellular communication performance without the power consumption cost of always maintaining those multiple antenna panels in an activated state, at least according to some embodiments.

FIGS. 7-11 and Additional Information

FIGS. 7-11 illustrate further aspects that might be used in conjunction with the method of FIG. 6 if desired. It should be noted, however, that the exemplary details illustrated in and described with respect to FIGS. 7-11 are not intended to be limiting to the disclosure as a whole: numerous variations and alternatives to the details provided herein below are possible and should be considered within the scope of the disclosure.

Figure 7:
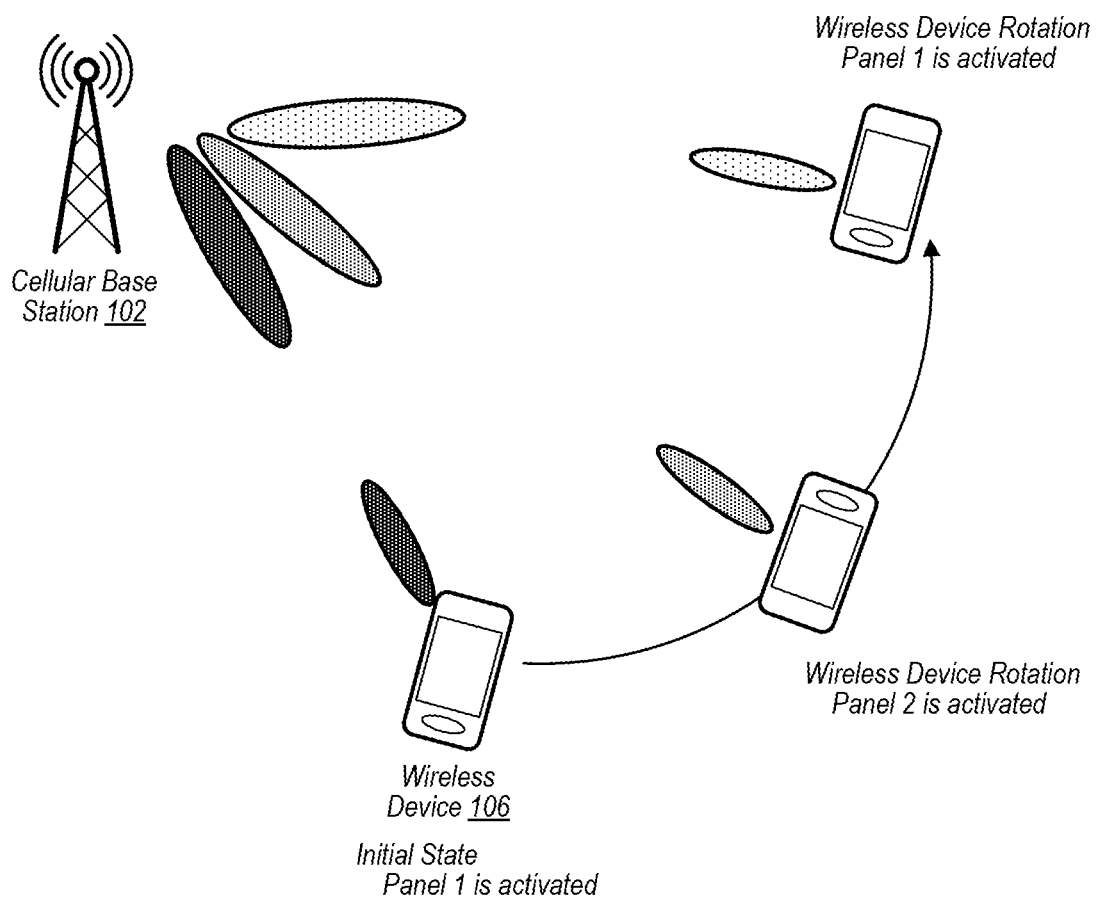
FIG. 7 illustrates aspects of an exemplary scenario in which a wireless device rotates and moves over time, and switches antenna panels to account for the rotation and movement, according to some embodiments.

At least according to some wireless device designs, multiple antenna panels may be utilized, for example such that different panels can target different (e.g., opposite or otherwise) directions, to increase coverage, and/or for various other reasons. However, at least for some wireless devices, it may not be practical for a wireless device to always activate all of its antenna panels, for example due to the power consumption cost of such permanent activation. Thus, it may be the case that a wireless device activates different antenna panels at different times, for example as a result of rotation and/or other movement. FIG. 7 illustrates aspects of such an example scenario in which a wireless device 106 initially has a first antenna panel activated, then after undergoing rotation activates a second antenna panel, and eventually after further rotation again activates the first antenna panel, in order to receive signals transmitted to the wireless device by a cellular base station 102. Activation of an antenna panel may require a certain amount of time, and thus in order to support operation of wireless devices that can utilize multiple antenna panels but do not maintain all of their antenna panels in an activated state, it may be useful to provide a framework in which a cellular network can account for and provide the potential additional delay that may be needed by a wireless device to perform antenna panel activation, while still potentially providing smaller scheduling delays when antenna panel activation is not required.

Figure 8:
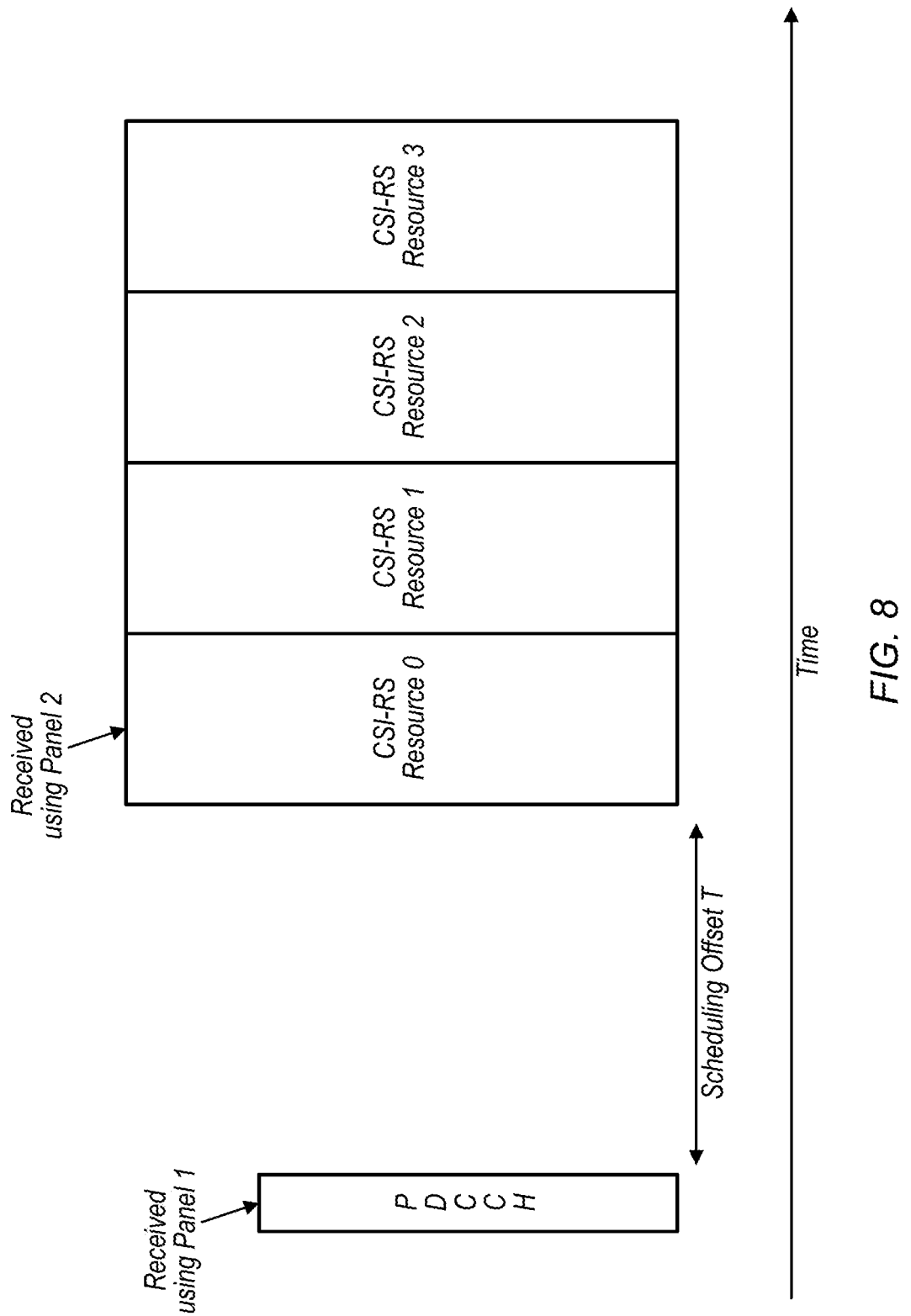
FIG. 8 is a timing diagram illustrating scheduling and transmission timing of a possible aperiodic CSI-RS transmission for beam management.

At least according to some embodiments, there may be certain circumstances in which additional delay for panel activation is required for downlink signals between a cellular base station and a wireless device. For example, in some instances, an additional delay for antenna panel activation may be required in certain circumstances in conjunction with aperiodic channel state information reference signal (CSI-RS) transmissions for tracking, CSI acquisition, and/or beam management. Additionally, in some instances, an additional delay for antenna panel activation may be required in certain circumstances in conjunction with physical downlink shared channel (PDSCH) transmissions. As an example, FIG. 8 is a timing diagram illustrating scheduling and transmission timing of a possible aperiodic CSI-RS transmission for beam management. As shown, in the illustrated scenario, a wireless device may receive a physical downlink control channel (PDCCH) communication scheduling the aperiodic CSI-RS transmission at a scheduling offset T, followed by the aperiodic CSI-RS transmission after the indicated scheduling offset T. In this example, the PDCCH communication may be received by the wireless device using one antenna panel, while at least a portion of the aperiodic CSI-RS transmission may be received by the wireless device using a different antenna panel. In this scenario as well as in various other scenarios, it may be beneficial to provide a framework to increase the likelihood (or possibly guarantee) that the scheduling offset provided by the network will be sufficient to allow for the wireless device to perform antenna panel activation when needed.

As part of such a framework, it may be useful for a wireless device to be able to inform the network (e.g., via a serving cellular base station) of the minimal delay required by the wireless device to receive aperiodic CSI-RS and PDSCH communications if antenna panel activation is required. As one possibility, a 'beamSwitchingTiming' parameter may be defined and reported by a wireless device, for example when providing UE capability information, using RRC signaling, and/or in any of various other ways. If the UE reports a value for the beamSwitchingTiming parameter that is above a certain threshold (e.g., a value of 224 or 336 symbols, as one possibility), this may be an indication that when antenna panel activation is required, the minimal scheduling offset used by the network should be the indicated value (e.g., 224 symbols or 336 symbols). Indication of a value for the beamSwitchingTiming parameter that is above the specified threshold may also implicitly indicate a minimal scheduling offset value (e.g., one of {14, 28, 42} symbols, among various other possibilities) for scenarios when antenna panel activation is not required. Alternatively, a further parameter could be defined and explicitly reported for indicating a minimal scheduling offset value for scenarios when antenna panel activation is not required. If the UE reports a value for the beamSwitchingTiming parameter that is below the specified threshold (e.g., one of {14, 28, 42} symbols, among various other possibilities), it may be the case that the serving cellular base station can assume that the UE does not require any additional delay to activate antenna panels. Such a scenario could occur, for example, if the UE is keeping all of its antenna panels activated, or if the UE has a very short antenna panel activation delay.

As a further part of such a framework, it may be useful to provide mechanisms for the network to determine when UE antenna panel activation may be required, e.g., in order to determine whether to use a minimal scheduling offset that supports antenna panel activation or a minimal scheduling offset that is less than would be sufficient to support antenna panel activation.

For example, for aperiodic CSI-RS for beam management, a UE may report a number of beam groups supported by the UE (e.g., which may correspond to the number of antenna panels of the UE, at least in some instances), and the number of beams per beam group supported by the UE (e.g., which may correspond to the number of beams each antenna panel of the UE supports, at least in some instances), to the serving cellular base station. When repetition for aperiodic CSI-RS is configured to be "on", if the number of scheduled CSI-RS resources is greater than the number of beams per beam group supported by the UE, the cellular base station may assume that additional delay is required by the wireless device for the aperiodic CSI-RS communication in order to account for antenna panel activation. Otherwise (e.g., if the number of scheduled CSI-RS resources is not greater than the number of beams per beam group supported by the UE, and/or if the UE does not have more than one beam group), the cellular base station may assume that no additional delay is required by the wireless device for the aperiodic CSI-RS communication in order to account for antenna panel activation.

If it is determined that additional delay is required by the wireless device for the aperiodic CSI-RS communication in order to account for antenna panel activation, as one possibility, the scheduling offset may be selected such that the minimal scheduling offset between the PDCCH to the first aperiodic CSI-RS resource is above the beamSwitchingTiming parameter reported by the wireless device. As another possibility, the scheduling offset may be selected such that the minimal scheduling offset between the PDCCH to the (K+1)th aperiodic CSI-RS resource is above the beamSwitchingTiming parameter reported by the wireless device, where K can be equal to the reported number of beams per beam group supported by the wireless device, or may otherwise be reported by the wireless device. If it is determined that additional delay is not required by the wireless device for the aperiodic CSI-RS communication in order to account for antenna panel activation, the scheduling offset may be selected such that the minimal scheduling offset between the PDCCH and the first aperiodic CSI-RS resource is at least equal to the minimal scheduling offset value (e.g., that is implicitly reported by the beamSwitchingTiming parameter or separately explicitly reported) for scenarios when antenna panel activation is not required.

Figure 9:
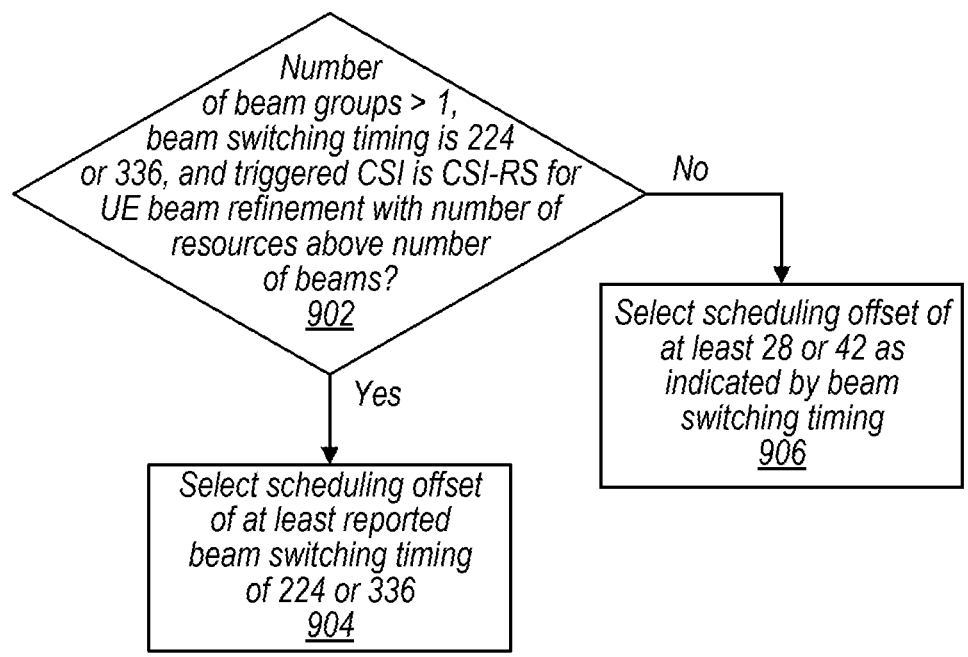
FIGS. 9-10 are flowchart diagrams illustrating example methods for selecting a scheduling offset in various scenarios, according to some embodiments.

FIG. 9 is a flowchart diagram illustrating one possible such method for determining a scheduling offset for an aperiodic CSI-RS transmission for beam management, according to some embodiments. As shown, in 902, upon triggering a CSI transmission to a UE, a cellular base station may determine if the number of beam groups for the UE is greater than 1, if the beam switching timing reported by the UE is 224 or 336 symbols, and if the triggered CSI transmission includes CSI-RS for UE beam refinement with a number of resources greater than the number of beams per beam group supported by the UE. If all of the conditions evaluated in step 902 are valid, in 904, the cellular base station may determine that the UE may require additional time for antenna panel activation, and so may select a scheduling offset of at least the beam switching timing value (e.g., 224 or 336 symbols) reported by the UE. In not all of the conditions evaluated in step 902 are valid, in 906, the cellular base station may determine that the UE may not require additional time for antenna panel activation, and so may select a smaller scheduling offset, for example of at least the smaller minimal scheduling offset value (e.g., 28 or 42 symbols) associated with the beam switching timing value reported by the UE, or otherwise according to a UE reported threshold minimal scheduling offset value. Note that while specific possible beam switching timing values are indicated in conjunction with FIG. 9, these values are provided by way of example only, and numerous other possible beam switching timing values (and/or units of measurement) are also possible.

Figure 10:
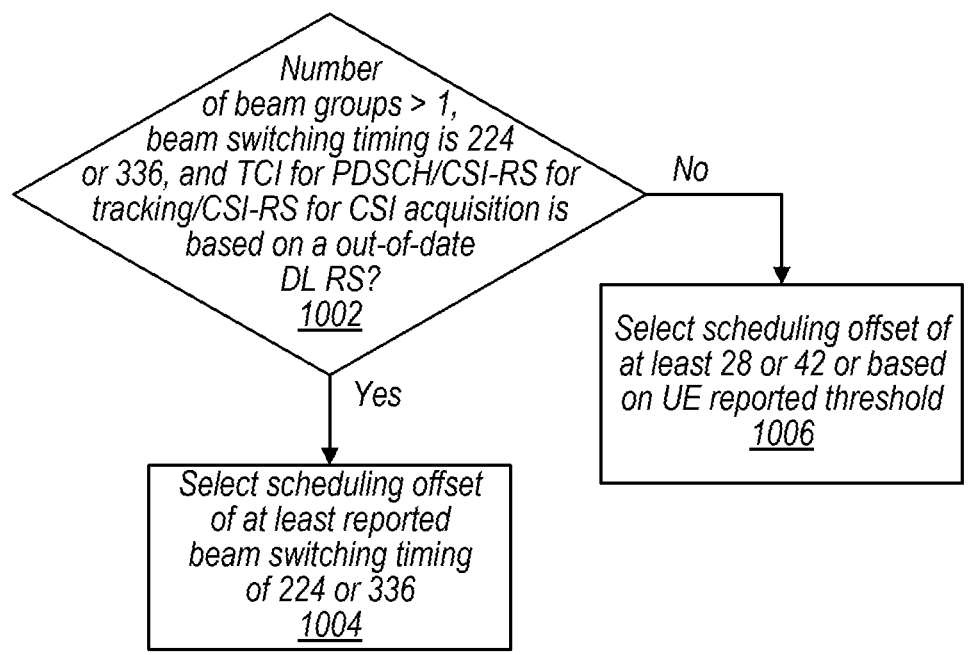

For aperiodic CSI-RS for tracking, aperiodic CSI-RS for CSI acquisition, and/or PDSCH transmissions, as one possibility, it may be possible for a cellular base station to simply assume that no additional delay for antenna panel activation is required by a UE, in which case the UE may generally track the TCI states configured for such signals from an already activated panel. Alternatively, in at least some instances, it may be useful to provide mechanisms for a cellular base station to determine when a UE may benefit from additional scheduling delay to perform UE antenna panel activation. For example, a framework in which a cellular base station determines whether the TCI state for a triggered transmission is considered "out-of-date", and either provides additional delay for panel activation if the TCI state is out-of-date or does not provide additional delay if the TCI state is not out-of-date could be used, according to some embodiments. FIG. 10 is a flowchart diagram illustrating one possible such method for determining a scheduling offset for an aperiodic CSI-RS transmission for tracking, an aperiodic CSI-RS transmission for CSI acquisition, or a PDSCH transmission, according to some embodiments. As shown, in 1002, upon triggering a transmission to a UE, a cellular base station may determine if the number of beam groups for the UE is greater than 1, if the beam switching timing reported by the UE is 224 or 336 symbols, and if the TCI for the transmission is based on an out-of-date reference signal. If all of the conditions evaluated in step 1002 are valid, in 1004, the cellular base station may determine that the UE may require additional time for antenna panel activation, and so may select a scheduling offset of at least the beam switching timing value (e.g., 224 or 336 symbols) reported by the UE. In not all of the conditions evaluated in step 1002 are valid, in 1006, the cellular base station may determine that the UE may not require additional time for antenna panel activation, and so may select a smaller scheduling offset, for example of at least the smaller minimal scheduling offset value (e.g., 28 or 42 symbols) associated with the beam switching timing value reported by the UE, or otherwise according to a UE reported threshold minimal scheduling offset value. Note that, similar to FIG. 9, while specific possible beam switching timing values are indicated in conjunction with FIG. 10, these values are provided by way of example only, and numerous other possible beam switching timing values (and/or units of measurement) are also possible.

In order to determine whether a TCI state is considered stale or out-of-date, one or more conditions may be used. As one possible condition, a TCI state could be considered out-of-date or stale if a downlink reference signal in the TCI state or quasi-co-located (QCLed) with the reference signal in the TCI state has not been reported in a CSI report within a certain amount of time (e.g., a threshold of M slots or milliseconds, as one possibility). As another possible condition, a TCI state could be considered out-of-date or stale if a downlink reference signal in the TCI state for the UE or QCLed with a downlink reference signal that is in a TCI state for a control resource set for the UE. As a further possible condition, a TCI state could be considered out-of-date or stale if a PDSCH transmission with the TCI state has not been transmitted within a certain amount of time (e.g., a threshold of M slots or milliseconds, as one possibility). As a still further possible condition, a TCI state could be considered out-of-date or stale if a periodic CSI-RS or semi-persistent CSI-RS with the TCI state has not been transmitted within a certain amount of time (e.g., a threshold of M slots or milliseconds, as one possibility). Note that the same or different threshold values could be used for such (or other) conditions, and the threshold value(s) could be predefined, determined based at least in part on UE capability reporting, configured by RRC signaling, and/or determined in any of various other possible ways. Such conditions could be used individually or in any combination to evaluate whether a TCI state is considered fresh/in-date or stale/out-of-date, according to various embodiments.

Figure 11:
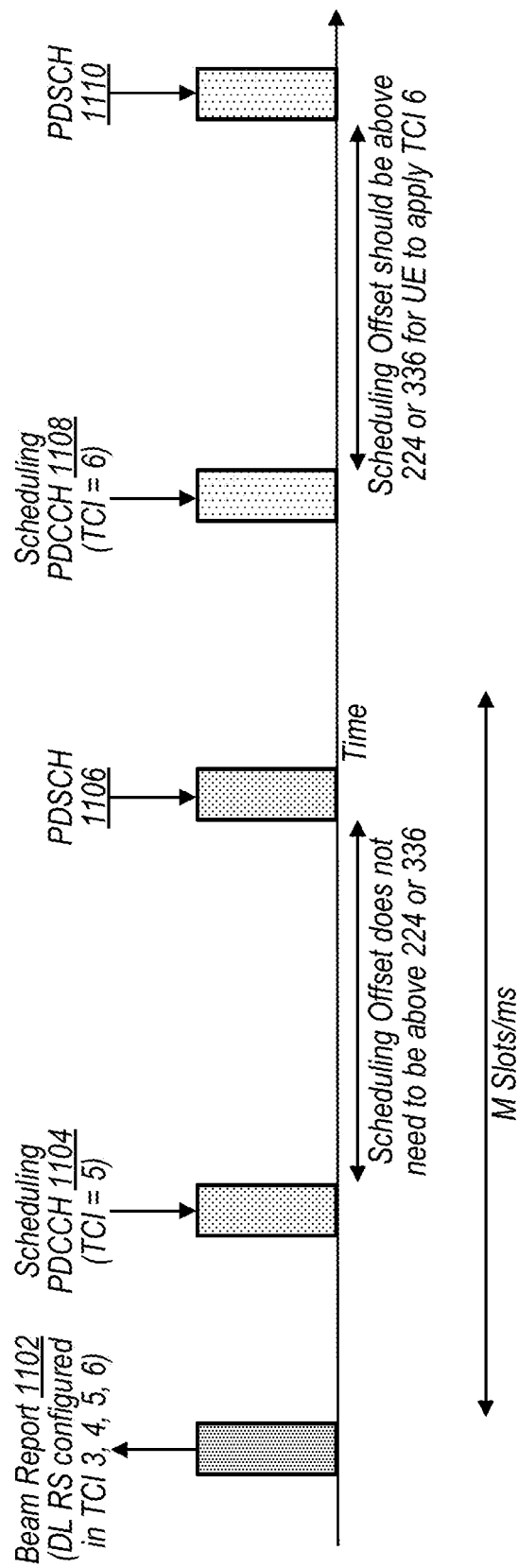
FIG. 11 illustrates a possible transmission timeline in which the scheduling offset for a downlink communication may be determined based on whether the TCI state for the downlink communication is considered stale, according to some embodiments.

As an example, FIG. 11 illustrates a possible transmission timeline in which such an approach to determining the scheduling offset for a downlink communication may be used, according to some embodiments. As shown, in the illustrated scenario, a cellular base station may receive a beam report 1102 from a UE, in accordance with which downlink reference signals may be configured in TCI 3, TCI 4, TCI 5, and TCI 6. The cellular base station may provide a PDCCH transmission 1104 with TCI=5, which may schedule a PDSCH transmission 1106. The PDCCH transmission 1104 may occur within the configured threshold M of receiving the beam report that included reporting on a downlink reference signal for TCI 5, so the cellular base station may determine that the UE may not require additional time for antenna panel activation, and so may schedule the PDSCH transmission 1106 with a scheduling offset that is less than the beamSwitchingTiming parameter (e.g., 224 or 336) reported by the UE. At a later time, the cellular base station may provide a PDCCH transmission 1108 with TCI=6, which may schedule a PDSCH transmission 1110. The PDCCH transmission 1108 may not occur within the configured threshold M of receiving the beam report that included reporting on a downlink reference signal for TCI 6, so the cellular base station may determine that the UE may require additional time for antenna panel activation, and so may schedule the PDSCH transmission 1106 with a scheduling offset that is at least the beamSwitchingTiming parameter (e.g., 224 or 336) reported by the UE.

Note that it may be the case that (e.g., in accordance with cellular communication standard specification documents) when a cellular base station determines that certain conditions exist that are indicative of UE antenna panel activation being required, the cellular base station always provides a scheduling offset that is at least equal to the reported beamSwitchingTiming value for the UE. However, in some instances, it may alternatively be the case that the cellular base station may also be permitted to provide a scheduling offset that is not at least equal to the reported beamSwitchingTiming value for the UE. In such a scenario, when the scheduling offset provided is below the threshold for antenna panel activation, the UE may apply a default TCI state, which may be determined in any of various ways. As one possibility, the default TCI state may be the TCI state for a CORESET with a lowest CORESET ID in the latest slots when multiple CORESETs are configured. Other ways of defining/identifying the default TCI state are also possible.

In the following further exemplary embodiments are provided.

One set of embodiments may include a cellular base station, comprising: at least one antenna; at least one radio coupled to the at least one antenna; and a processor coupled to the at least one radio; wherein the cellular base station is configured to: receive an indication of an antenna panel activation delay from a wireless device; select a scheduling offset for a transmission to the wireless device based at least in part on the antenna panel activation delay; and schedule the transmission to the wireless device using the scheduling offset.

According to some embodiments, the cellular base station is further configured to: perform the transmission to the wireless device at the scheduling offset after scheduling the transmission to the wireless device.

According to some embodiments, the transmission to the wireless device comprises an aperiodic channel state information reference signal (CSI-RS) transmission for beam management, wherein the cellular base station is further configured to: receive an indication of a number of beams per beam group supported by the wireless device; determine whether a number of scheduled CSI-RS resources of the aperiodic CSI-RS transmission is above the number of beams per beam group supported by the wireless device; and select a value of at least the antenna panel activation delay for the scheduling offset when the number of scheduled CSI-RS resources of the aperiodic CSI-RS transmission is above the number of beams per beam group supported by the wireless device and when repetition is configured to be on for the scheduled CSI-RS resources.

According to some embodiments, the cellular base station is further configured to: select a value of less than the antenna panel activation delay for the scheduling offset when the number of scheduled CSI-RS resources of the aperiodic CSI-RS transmission is not greater than the number of beams per beam group supported by the wireless device.

According to some embodiments, the transmission to the wireless device comprises an aperiodic channel state information reference signal (CSI-RS) transmission for beam management, wherein the cellular base station is further configured to: receive an indication of a number of beams per beam group supported by the wireless device; determine whether a number of scheduled CSI-RS resources of the aperiodic CSI-RS transmission is above the number of beams per beam group supported by the wireless device; and select a scheduling offset such that at least the antenna panel activation delay passes before the end of the transmission to the wireless device when the number of scheduled CSI-RS resources of the aperiodic CSI-RS transmission is above the number of beams per beam group supported by the wireless device.

According to some embodiments, the transmission to the wireless device comprises an aperiodic channel state information reference signal (CSI-RS) transmission for tracking, an aperiodic CSI-RS transmission for channel state information acquisition, or a physical downlink shared channel (PDSCH) transmission, wherein the cellular base station is further configured to: determine whether a transmission configuration indicator (TCI) state for the transmissions is stale; select a value of at least the antenna panel activation delay for the scheduling offset when the TCI state for the transmission is stale.

According to some embodiments, the cellular base station is further configured to: select a value of less than the antenna panel activation delay for the scheduling offset when the TCI state for the transmission is not stale.

According to some embodiments, the cellular base station is further configured to determine that a TCI state for a transmission is stale when at least one of a downlink reference signal in the TCI state or quasi-co-located with a reference signal in the TCI state has not been reported by the wireless device within a threshold amount of time; a downlink reference signal in the TCI state is not configured in a TCI state for a control resource set or quasi-co-located with a downlink reference signal that is configured in a TCI state for a control resource set for the wireless device; a PDSCH transmission with the TCI state has not been transmitted to the wireless device within a threshold amount of time; or a periodic CSI-RS or semi-persistent CSI-RS with the TCI state has not been transmitted to the wireless device within a threshold amount of time.

Another set of embodiments may include an apparatus, comprising: a processor configured to cause a cellular base station to: receive an indication of an antenna panel activation delay from a wireless device; select a scheduling offset for a transmission to the wireless device based at least in part on the antenna panel activation delay; schedule the transmission to the wireless device using the scheduling offset; and perform the transmission to the wireless device at the scheduling offset after scheduling the transmission to the wireless device.

According to some embodiments, the processor is further configured to cause the cellular base station to: receive an indication of a number of beams per beam group supported by the wireless device; determine whether a number of scheduled channel state information reference signal (CSI-RS) resources of the transmission is above the number of beams per beam group supported by the wireless device; and select the scheduling offset further based at least in part on whether the number of scheduled CSI-RS resources transmission is above the number of beams per beam group supported by the wireless device.

According to some embodiments, the processor is further configured to cause the cellular base station to: determine whether a transmission configuration indicator (TCI) state for the transmissions is out-of-date; and select the scheduling offset further based at least in part on whether the TCI state for the transmission is out-of-date.

According to some embodiments, the processor is further configured to cause the cellular base station to: determine that the TCI state for the transmission is out-of-date when a downlink reference signal in the TCI state or quasi-co-located with a reference signal in the TCI state has not been reported by the wireless device within a threshold amount of time.

According to some embodiments, the processor is further configured to cause the cellular base station to: determine that the TCI state for the transmission is out-of-date when a downlink reference signal in the TCI state is not configured in a TCI state for a control resource set for the wireless device or quasi-co-located with a downlink reference signal that is configured in a TCI state for a control resource set for the wireless device.

According to some embodiments, the processor is further configured to cause the cellular base station to: determine that the TCI state for the transmission is out-of-date when a PDSCH transmission with the TCI state has not been transmitted to the wireless device within a threshold amount of time.

According to some embodiments, the processor is further configured to cause the cellular base station to: determine that the TCI state for the transmission is out-of-date when a periodic channel state information reference signal (CSI-RS) or semi-persistent CSI-RS with the TCI state has not been transmitted to the wireless device within a threshold amount of time.

Yet another set of embodiments may include a wireless device, comprising at least two antenna panels; at least one radio coupled to the at least two antenna panels; and a processor coupled to the at least one radio; wherein the wireless device is configured to: provide an indication of an antenna panel activation delay of the wireless device to a cellular base station; and receive downlink control information scheduling a transmission from the cellular base station, wherein the transmission is scheduled at a delay of at least the antenna panel activation delay of the wireless device after the downlink control information is received.

According to some embodiments, the wireless device is further configured to, at a later time: provide an indication of an updated antenna panel activation delay of the wireless device.

According to some embodiments, the transmission comprises one of: an aperiodic channel state information reference signal (CSI-RS) transmission for tracking; an aperiodic CSI-RS transmission for CSI acquisition; an aperiodic CSI-RS transmission for beam management; or a physical downlink shared channel (PDSCH) transmission.

According to some embodiments, the wireless device is further configured to: provide an indication of a number of beam groups and a number of beams per group of the wireless device to the cellular base station.

According to some embodiments, the wireless device is further configured to: receive downlink control information scheduling a transmission from the cellular base station, wherein the transmission is scheduled at a delay of less than the antenna panel activation delay of the wireless device after the downlink control information is received; and apply a default transmission configuration indication (TCI) state when receiving the transmission based at least in part on the transmission being scheduled at a delay of less than the antenna panel activation delay of the wireless device after the downlink control information is received.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising: by a device: performing any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cellular base station, comprising:
   at least one antenna;
   at least one radio coupled to the at least one antenna; and
   a processor coupled to the at least one radio;
   wherein the at least one antenna, the at least one radio, and the processor are configured to cause the cellular base station to:
   receive an indication of a delay from a wireless device;
   select a scheduling offset for a transmission to the wireless device large enough for beam switching at the wireless device based at least in part on the delay, wherein the scheduling offset is an offset between a physical downlink control channel (PDCCH) transmission and an aperiodic channel state information reference signal (A-CSI-RS) transmission that is triggered by the PDCCH, wherein:
   when the delay is one of 224 or 336 symbols, the A-CSI-RS is configured for repetitions and a number of beam groups is greater than 1, select the scheduling offset to be at least the delay, and otherwise select the scheduling offset to be a value lower than 224 or 336 symbols;
   transmit the PDCCH triggering the A-CSI-RS transmission at the scheduling offset; and
   transmit the A-CSI-RS CSI RS based on the scheduling offset.

2. The cellular base station of claim 1, wherein the value lower than 224 or 336 symbols is one of 48 or 24 symbols.

3. The cellular base station of claim 1, wherein the A-CSI-RS transmission is for beam management, wherein the at least one antenna, the at least one radio, and the processor are further configured to cause the cellular base station to:
  receive an indication of a number of beams per beam group supported by the wireless device;
  determine whether a number of scheduled channel state information reference signal (CSI-RS) resources of the A-CSI-RS transmission is above the number of beams per beam group supported by the wireless device; and
  select a value of at least the antenna panel activation delay for the scheduling offset when the number of scheduled CSI-RS resources of the A-CSI-RS transmission is above the number of beams per beam group supported by the wireless device and when repetition is configured to be on for the scheduled CSI-RS resources.

4. The cellular base station of claim 3, wherein the at least one antenna, the at least one radio, and the processor are further configured to cause the cellular base station to:
  select a value of less than the antenna panel activation delay for the scheduling offset when the number of scheduled CSI-RS resources of the A-CSI-RS transmission is not greater than the number of beams per beam group supported by the wireless device.

5. The cellular base station of claim 1, wherein the A-CSI-RS transmission is for beam management, wherein the at least one antenna, the at least one radio, and the processor are further configured to cause the cellular base station to:
  receive an indication of a number of beams per beam group supported by the wireless device;
  determine whether a number of scheduled channel state information reference signals (CSI-RS) resources of the A-CSI-RS transmission is above the number of beams per beam group supported by the wireless device; and
  select a scheduling offset such that at least the antenna panel activation delay passes before the end of the transmission to the wireless device when the number of scheduled CSI-RS resources of the A-CSI-RS transmission is above the number of beams per beam group supported by the wireless device.

6. The cellular base station of claim 1, wherein the A-CSI-RS transmission is for tracking, an A-CSI-RS transmission for channel state information acquisition, or a physical downlink shared channel (PDSCH) transmission, wherein the at least one antenna, the at least one radio, and the processor are further configured to cause the cellular base station to:
  determine whether a transmission configuration indicator (TCI) state for the transmission is stale;
  select a value of at least the antenna panel activation delay for the scheduling offset when the TCI state for the transmission is stale.

7. The cellular base station of claim 6, wherein the at least one antenna, the at least one radio, and the processor are further configured to cause the cellular base station to:
  select a value of less than the antenna panel activation delay for the scheduling offset when the TCI state for the transmission is not stale.

8. The cellular base station of claim 6, wherein the cellular base station is further configured to determine that a TCI state for a transmission is stale when at least one of:
  a downlink reference signal in the TCI state or quasi-co-located with a reference signal in the TCI state has not been reported by the wireless device within a threshold amount of time;
  a downlink reference signal in the TCI state is not configured in a TCI state for a control resource set or quasi-co-located with a downlink reference signal that is configured in a TCI state for a control resource set for the wireless device;
  a PDSCH transmission with the TCI state has not been transmitted to the wireless device within a threshold amount of time; or
  a periodic CSI-RS or semi-persistent CSI-RS with the TCI state has not been transmitted to the wireless device within a threshold amount of time.

9. An apparatus, comprising:
  a processor configured to cause a cellular base station to:
  receive an indication of a delay from a wireless device;
  select a scheduling offset for a transmission to the wireless device large enough for beam switching at the wireless device based at least in part on the delay, wherein the scheduling offset is an offset between a physical downlink control channel (PDCCH) transmission and an aperiodic channel state information reference signal (A-CSI-RS) transmission that is triggered by the PDCCH, wherein:
    when the delay is one of 224 or 336 symbols, the A-CSI-RS is configured for repetitions and a number of beam groups is greater than 1, select the scheduling offset to be at least the delay, and otherwise select the scheduling offset to be a value lower than 224 or 336 symbols;
  transmit the PDCCH triggering the A-CSI-RS transmission at the scheduling offset; and
  transmit the A-CSI-RS to the wireless device based on the scheduling offset.

10. The apparatus of claim 9, wherein the processor is further configured to cause the cellular base station to:
  receive an indication of a number of beams per beam group supported by the wireless device;
  determine whether a number of scheduled channel state information reference signal (CSI-RS) resources of the transmission is above the number of beams per beam group supported by the wireless device; and
  select the scheduling offset further based at least in part on whether the number of scheduled CSI-RS resources transmission is above the number of beams per beam group supported by the wireless device.

11. The apparatus of claim 9, wherein the processor is further configured to cause the cellular base station to:
  determine whether a transmission configuration indicator (TCI) state for the transmission is out-of-date; and
  select the scheduling offset further based at least in part on whether the TCI state for the transmission is out-of-date.

12. The apparatus of claim 11, wherein the processor is further configured to cause the cellular base station to:
  determine that the TCI state for the transmission is out-of-date when a downlink reference signal in the TCI state or quasi-co-located with a reference signal in the TCI state has not been reported by the wireless device within a threshold amount of time.

13. The apparatus of claim 11, wherein the processor is further configured to cause the cellular base station to:
  determine that the TCI state for the transmission is out-of-date when a downlink reference signal in the TCI state is not configured in a TCI state for a control resource set for the wireless device or quasi-co-located with a downlink reference signal that is configured in a TCI state for a control resource set for the wireless device.

14. The apparatus of claim 11, wherein the processor is further configured to cause the cellular base station to:

determine that the TCI state for the transmission is out-of-date when a physical downlink shared channel (PDSCH) transmission with the TCI state has not been transmitted to the wireless device within a threshold amount of time.

15. The apparatus of claim 11, wherein the processor is further configured to cause the cellular base station to:

determine that the TCI state for the transmission is out-of-date when a periodic channel state information reference signal (CSI-RS) or semi-persistent CSI-RS with the TCI state has not been transmitted to the wireless device within a threshold amount of time.

16. The apparatus of claim 9, wherein the value lower than 224 or 336 symbols is one of 48 or 24 symbols.

17. A method, comprising:

by a base station:

receiving an indication of a delay from a wireless device;

selecting a scheduling offset for a transmission to the wireless device large enough for beam switching at the wireless device based at least in part on the delay, wherein the scheduling offset is an offset between a physical downlink control channel (PDCCH) transmission and an aperiodic channel state information reference signal (A-CSI-RS) transmission that is triggered by the PDCCH, wherein:

when the delay is one of 224 or 336 symbols, the A-CSI-RS is configured for repetitions and a number of beam groups is greater than 1, select the scheduling offset to be at least the delay, and otherwise select the scheduling offset to be a value lower than 224 or 336 symbols;

transmitting the PDCCH triggering the A-CSI-RS transmission at the scheduling offset; and transmitting the A-CSI-RS CSI RS based on the scheduling offset.

18. The method of claim 17, wherein the value lower than 224 or 336 symbols is one of 48 or 24 symbols.

19. The method of claim 17, further comprising:

receiving an indication of a number of beams per beam group supported by the wireless device;

determining whether a number of scheduled channel state information reference signal (CSI-RS) resources of the transmission is above the number of beams per beam group supported by the wireless device; and selecting the scheduling offset further based at least in part on whether the number of scheduled CSI-RS resources transmission is above the number of beams per beam group supported by the wireless device.

20. The method of claim 17, further comprising:

determining whether a transmission configuration indicator (TCI) state for the transmission is out-of-date; and selecting the scheduling offset further based at least in part on whether the TCI state for the transmission is out-of-date.

* * * * *